March 13, 1962
W. D. KELLY
3,024,833
METHOD OF AND APPARATUS FOR MAKING SPIRAL
TUBULAR SHEATHED ELECTRIC HEATERS
Filed Nov. 10, 1958
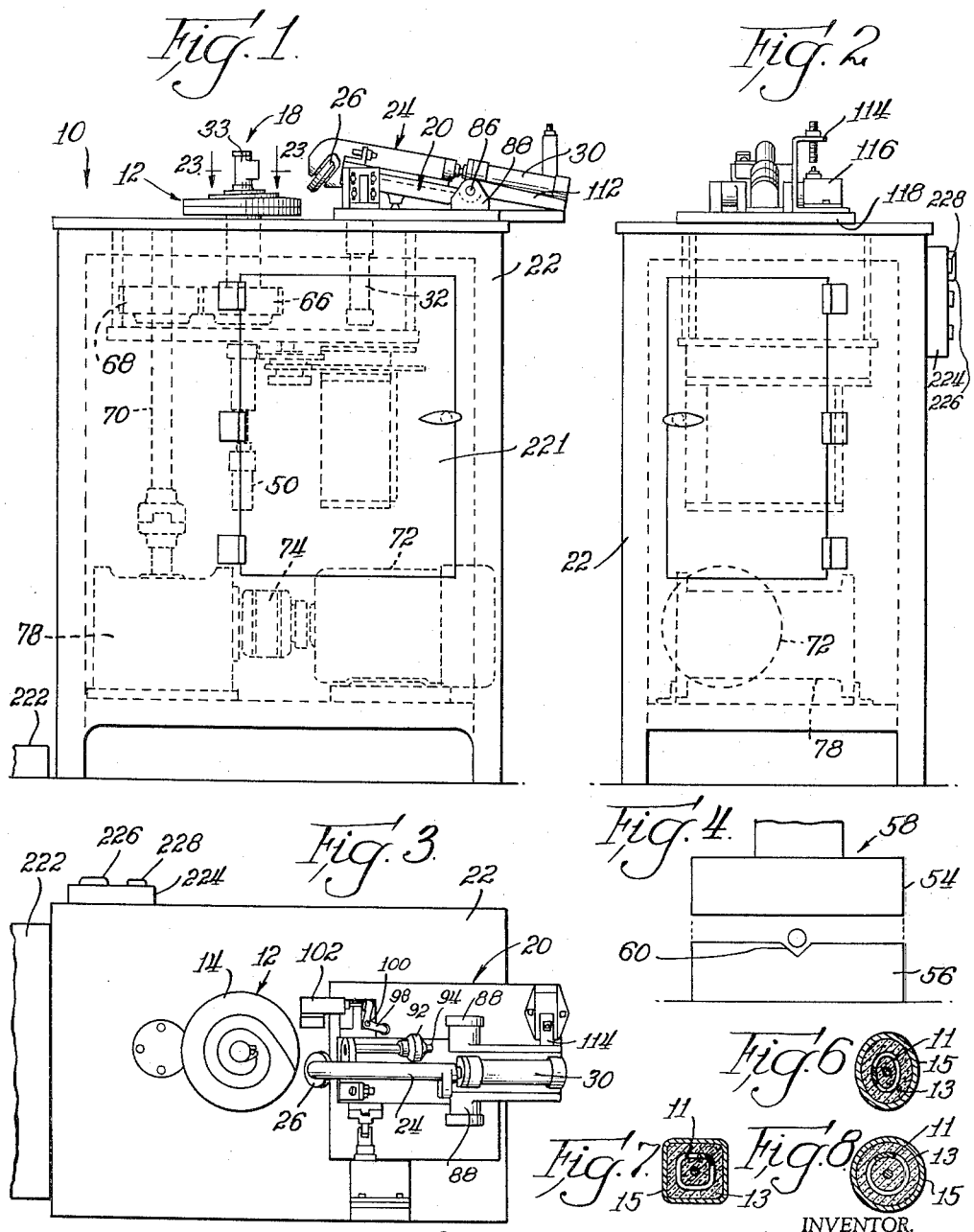
INVENTOR.
William D. Kelly
BY
Eugene M. Giles att'y.

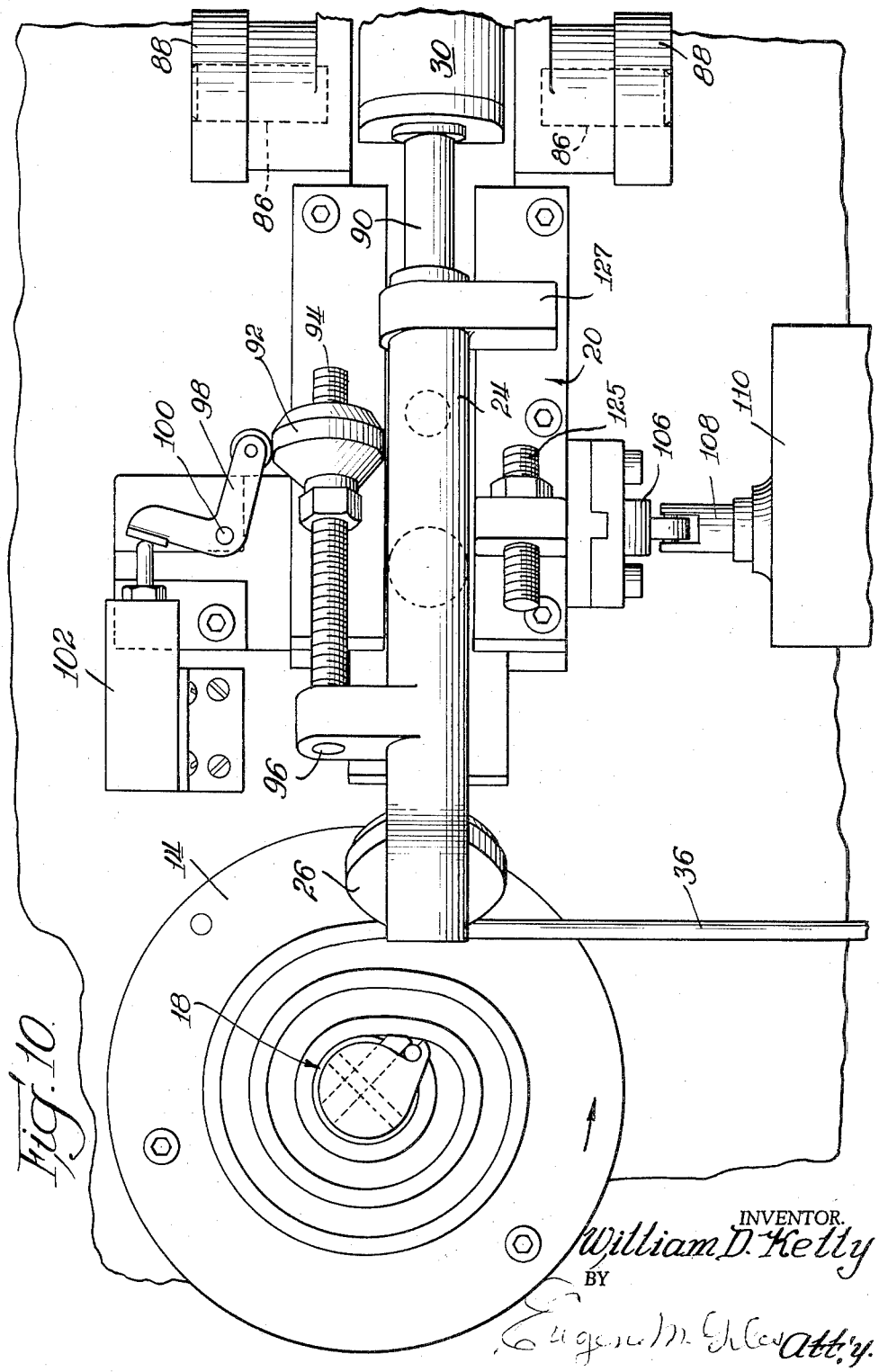

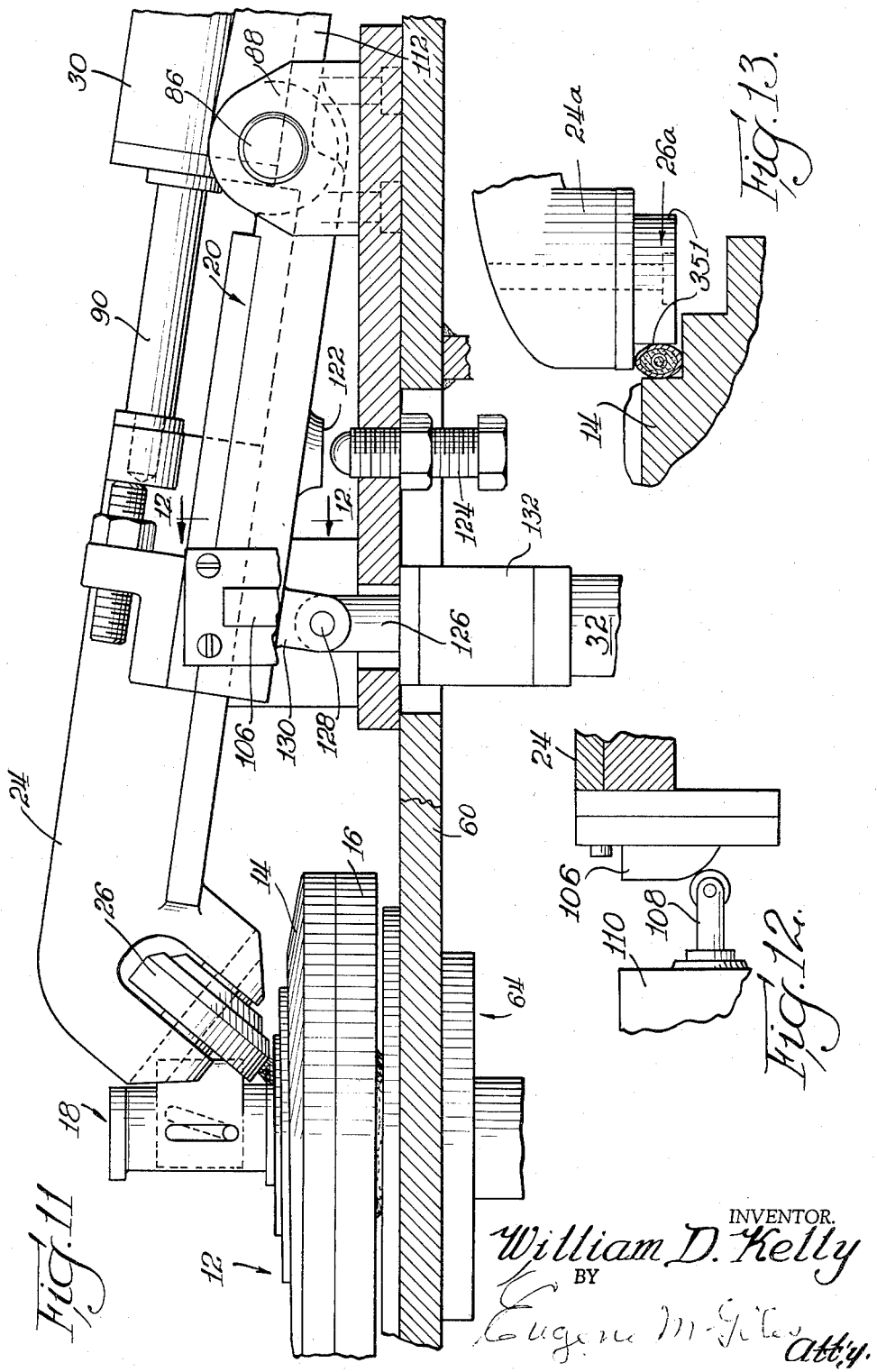

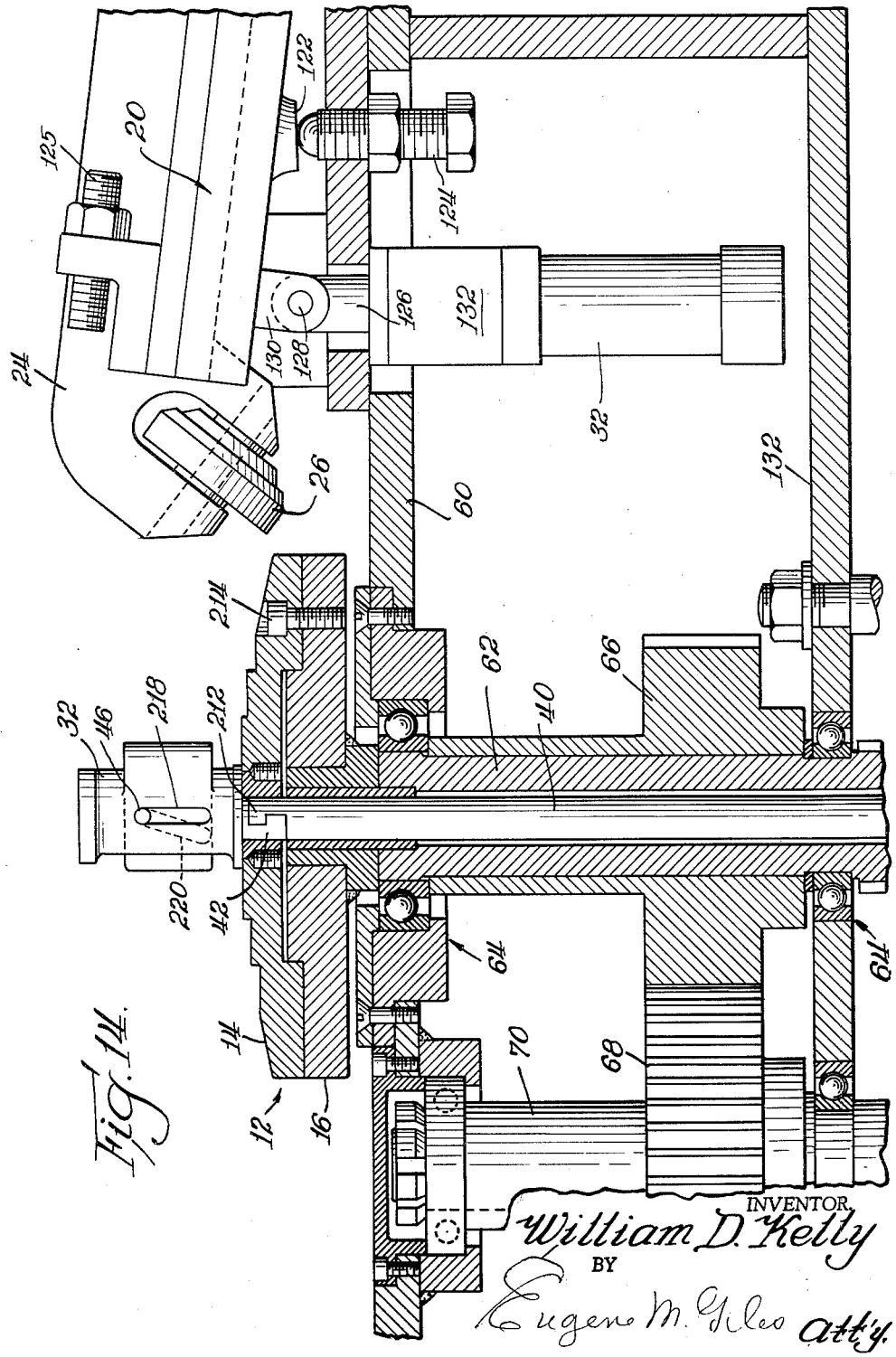

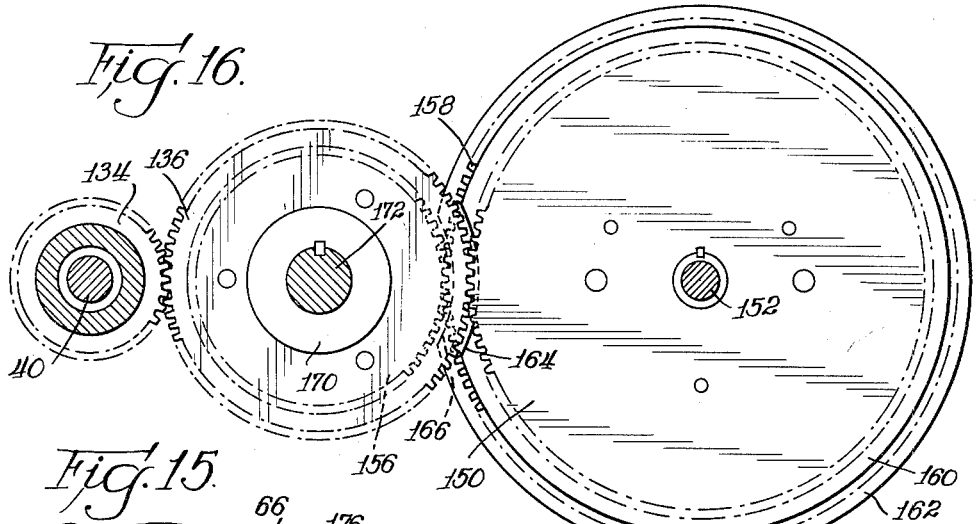
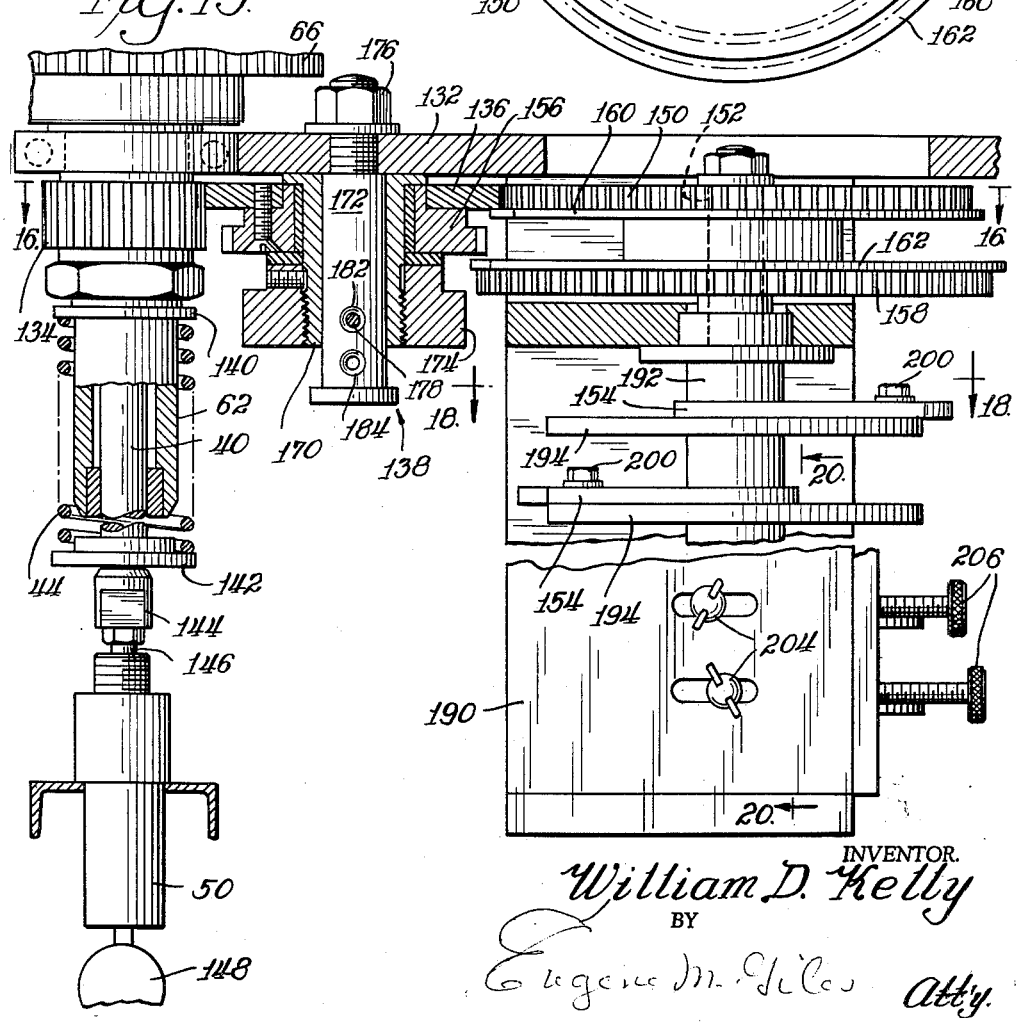

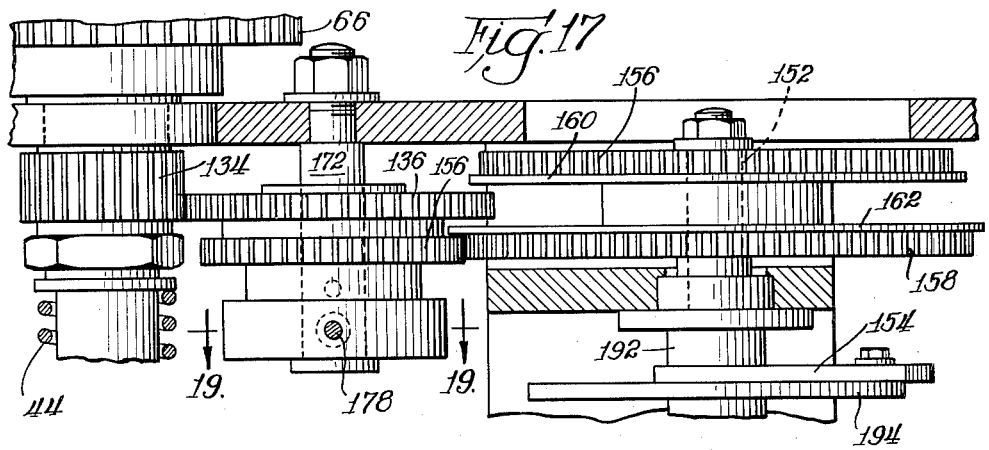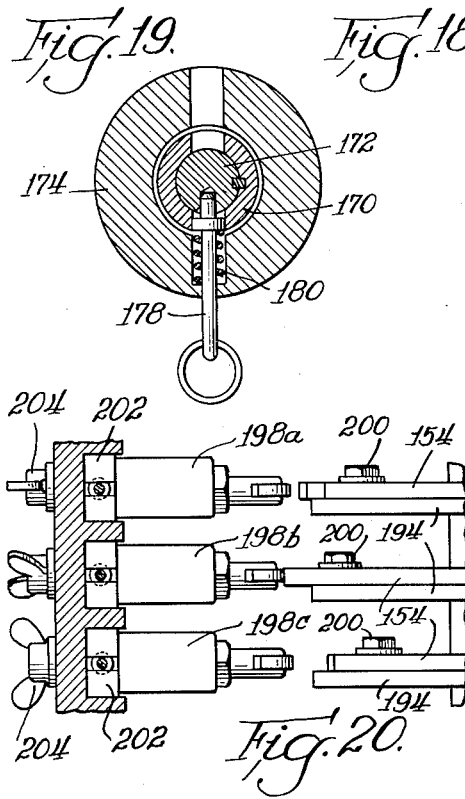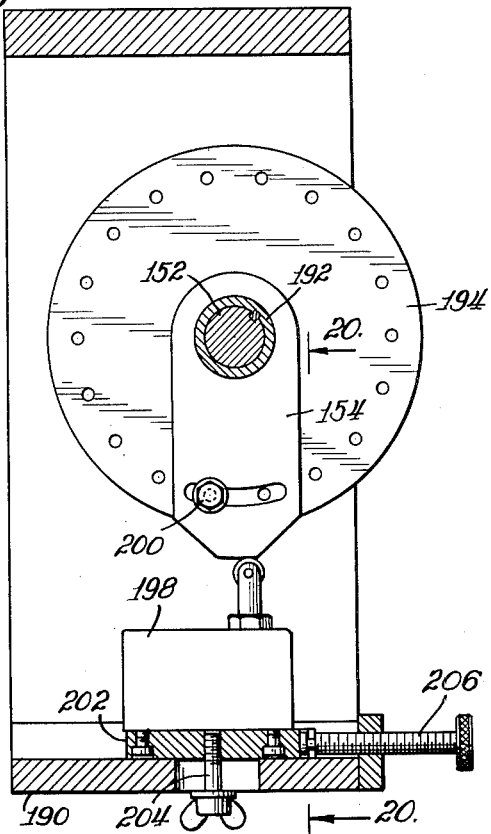

March 13, 1962 W. D. KELLY 3,024,833
METHOD OF AND APPARATUS FOR MAKING SPIRAL
TUBULAR SHEATHED ELECTRIC HEATERS
Filed Nov. 10, 1958 9 Sheets-Sheet 8
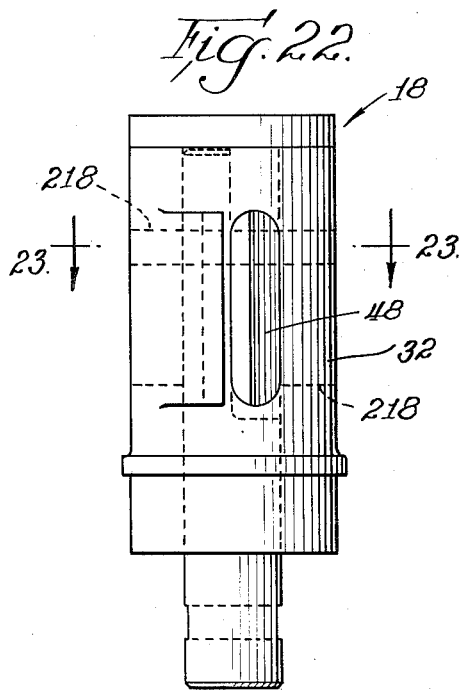
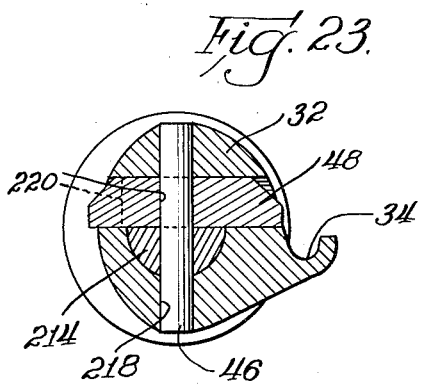
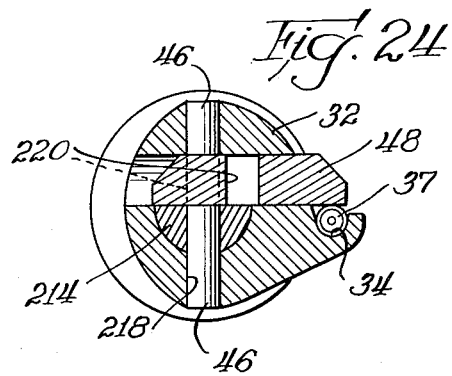
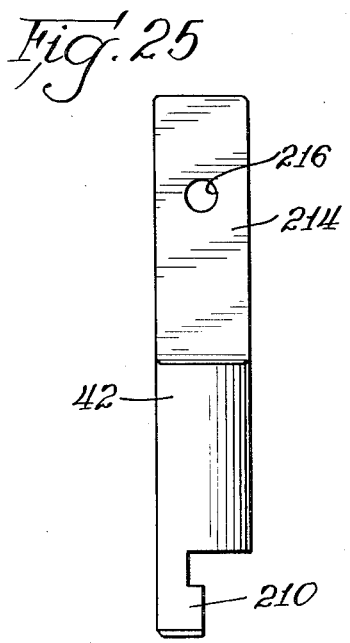
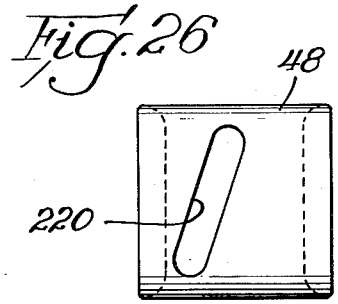
INVENTOR.
William D. Kelly
BY
Eugene M. Giles atty.

March 13, 1962

W. D. KELLY 3,024,833

METHOD OF AND APPARATUS FOR MAKING SPIRAL
TUBULAR SHEATHED ELECTRIC HEATERS

Filed Nov. 10, 1958

INVENTOR.
William D. Kelly
BY
Eugene McGil atty.

United States Patent Office 3,024,833
Patented Mar. 13, 1962

1

3,024,833
METHOD OF AND APPARATUS FOR MAKING SPIRAL TUBULAR SHEATHED ELECTRIC HEATERS
William D. Kelly, Western Springs, Ill., assignor to Ferro Corporation, Cleveland, Ohio, a corporation of Ohio
Filed Nov. 10, 1958, Ser. No. 772,831
9 Claims. (Cl. 153—64)

This invention relates to a method of and apparatus for making tubular sheathed electrical heating elements in the form of a flat spiral winding such as commonly used in range surface heating units for supporting cooking utensils thereon, and has reference more particularly to an improved method and apparatus whereby such elements may be coiled with a wide flat top face at the utensil supporting side of the spiral.

Heating elements of the type to which this invention relates have a long helical resistance extending lengthwise within a metal tube or sheath embedded in heat conductive electrical insulating material, such as powered magnesium oxide, which is compacted to high density in the sheath to hold the resistance in place therein and safely insulate it electrically from the sheath.

Initially the sheath is a straight metal tube of a length to form the winding and provide extra end portions which may be bent away from the winding to lead to a place where current supply conductors are connectible to terminal wires from the opposite ends of the resistance, and, while the tube is in a straight length, the resistance and insulation are installed or loaded therein and the insulation well compacted to hold the resistance in place. A tube of circular cross section is commonly employed and while the circular cross section is sometimes preserved throughout the making of the heating unit, it is customary to change the cross section to provide a wide flat face at the utensil supporting side of the winding in the final form thereof.

After the tube is thus loaded, it is the usual practice to compress the loaded tube or sheath and contents sidewise preferably by an operation known as slabbing, to further compact the insulation so that the element is practically a solid rod, after which it is coiled into the spiral winding form of the eventual heating unit.

It has been considered advantageous to minimize the thickness of the loaded tube in the direction of bending thereof in the coiling operation, and such tubular sheathed elements were commonly compressed into oval or square cross section for this purpose before coiling and the compression to such oval or square cross section was commonly performed in the slabbing, When properly loaded, the insulation becomes sufficiently hard and solid so that the resistance therein responds in general cross sectional shape to the cross sectional shape imparted to the tube or sheath in the slabbing operation, and it responds likewise to subsequent cross sectional reshaping of the tube so that in the eventual or final shape of the tubular sheathed element, the resistance corresponds in cross section quite closely to the cross section of the tube or sheath.

After the heating element was prepared as above explained, and slabbed, it was coiled in a spiral form corresponding to that desired in the final surface heating unit and heretofore it was commonly coiled on a spiral shoulder of a generally cone shaped from by merely

2 securing the leading end of the element to the nose or open portion of the cone shaped form and then holding the outer end portion of the element, as the cone rotated, so as to lead the element down the spiral shoulder toward the base of the cone and draw it tightly against the shoulder in conformity with the spiral shape.

Such coiling operation produces a conical spiral and thereafter the coils are pressed sidewise so that all of the coils lie approximately in a common plane for application in a press in which the coiled element is subjected to a heavy pressure to finally compress the element so that the insulation is compacted as densely as possible and the coils located uniformly in a common plane.

In this final compressing a grooved die is employed to impart the final cross sectional shape to the tubular sheathed element of the winding, and as the stresses incidental to the above coiling operation could not be accurately controlled nor the length of the coiled portion of the element regulated with accuracy, such variation in the windings occured that difficulty was oftentimes experienced in locating the coiled element properly on the grooved die for the final compression thereof.

A final cross section of the element providing a relatively shallow depth and a wide top face, as for example, a flat top shallow depth generally triangular cross section, is preferred in surface heating units to insure a wide area of contact with the bottom of a cooking utensils for fast conductivity of heat thereto, and this requires a correspondingly wide groove in the final compression die of generally triangular or other relatively shallow depth and a flat faced forming die cooperable therewith to impart the final shape and compression to the element, and if the element is coiled in a round, oval or square cross section and does not closely match the cross section of the groove of the die, the coiled element does not readily register with the groove of the die and may shift therein as the closing pressure is applied and cause undesirable distortion of the heating element, such for example, as excess rounding along one edge of the element and insufficient rounding or sharp cornering of the opposite edge, and moreover, excessive wear is imposed on the die and frequent replacement thereof is required at a considerable expense.

Furthermore, repeated reshaping of the element to different cross sections, and especially where they are substantially different, is objectionable as it materially weakens the element and may occasion some eventual displacement of the resistance in the sheath, and it is highly advantageous, not only on that account but also to avoid displacement of the element in the final compression die and excessive wear on that die, to impart to the element in the initial side pressing or slabbing thereof a cross section corresponding to that of the final element and to preserve that shape throughout the operations thereafter.

The principal objects of the invention are, to provide a coiling method and apparatus which insures consistent uniformity of coiling of heating elements in a flat spiral form; to provide controls which perform the coiling operation automatically and with exactitude as to length of the coiled portion; to insure uniform stressing of the element throughout the length of the coiled portion thereof; to simplify and expedite the coiling operation and avoid hazards attendant to the operation of previous coiling machines; to permit the coiling of elements of various cross sectional shapes including wide flat faced elements of shallow depth such as generally triangular or the like; and to permit heating elements to be initially compressed to a cross section with a width flat side corresponding to that of the final heating unit and substantially preserve that shape throughout the subsequent operations; these and other objects being accomplished as pointed out more particularly hereinafter and as shown in the accompanying drawings, in which:

FIG. 1 is a side elevational view of a preferred embodiment of the invention;

FIG. 2 is an elevational view of the right hand side of the embodiment of FIG. 1;

FIG. 3 is a top plan view of the machine shown in FIG. 1;

FIG. 4 is a diagrammatic view illustrating a slabbing operation to prepare the heating element in a generally triangular shape for coiling;

FIG. 5 is a cross-sectional view of a completed heating element, and which may have a generally similar cross-sectional configuration prior to coiling thereof in accordance with the principles of this invention, the said element being shown between the fragmentary portions of the dies by which the final shape is imparted thereto;

FIGS. 6, 7 and 8 are views showing cross-sectional shapes such as heretofore used in coiling and which may be coiled with the coiling machine of this invention;

FIG. 10 is a view similar to that of FIG. 9, but illustrating the coiling element after the coiling step has been completed, but before the element has been released from the machine;

FIG. 11 is a side elevational view of the structure shown in FIG. 9, parts being broken away for clarity of illustration;

FIG. 12 is a fragmental cross-sectional view along line 12—12 of FIG. 11;

FIG. 13 is a fragmental view illustrating a modified form of coiling form presser element;

FIG. 14 is a view similar to that of FIG. 11, but shown mainly in section, illustrating further details of the invention;

FIG. 15 is a cross sectional view at the same place as that of FIG. 14, but showing the elements that are located below those shown in FIG. 14;

FIG. 16 is a diagrammatic cross-sectional view along line 16—16 in FIG. 15, showing one selective position of a transmission employed in the illustrated embodiments;

FIG. 17 is a side view of the parts of FIG. 15, but showing a different selective position of the transmission;

FIG. 18 is a cross-sectional view along line 18—18 of FIG. 15;

FIG. 19 is a cross-sectional view along line 19—19 of FIG. 17;

FIG. 20 is a fragmental cross-sectional view along line 20—20 of FIG. 15;

FIG. 21 is a perspective view of one of the control adjusting elements shown in FIGS. 18 and 20;

FIG. 22 is an elevational view of the latching device employed in the embodiment of the invention shown in FIG. 1;

FIG. 23 is a cross-sectional view along lines 23—23 of FIGS. 1 and 22, showing the latching device in unlocked position;

FIG. 24 is a cross-sectional view similar to that of FIG. 23 illustrating the latch device in locked position;

FIG. 25 is a side elevational view of the actuating element of the latching device;

FIG. 26 is a side elevational view of the latch bar of the latching device; and

FIG. 27 is a diagrammatic illustration of a control system for the various parts of the coiling machine.

General Description

Figure 9:
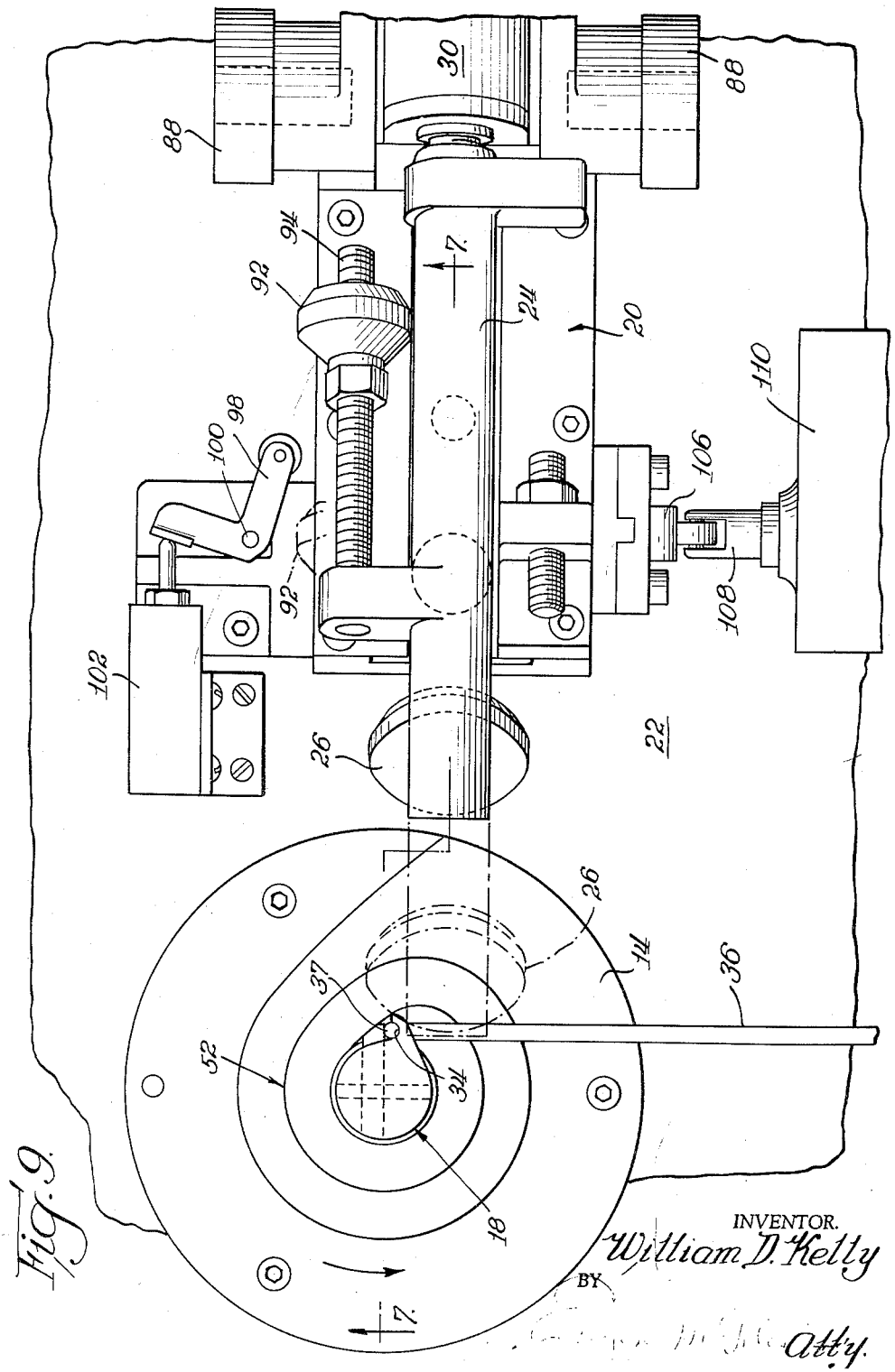
FIG. 9 is an enlarged plan view of the coiling form and associated parts of FIGS. 1, 2 and 3, but showing them illustrated in the coiling position thereof.

Reference numeral 10 of FIG. 1 indicates generally a preferred embodiment of my invention, which was designed for coiling or winding heating elements having a cross section configuration shown in FIG. 5 and including a suitable resistor 11 embedded in magnesium oxide 13 within a sheath 15. As shown in FIGS. 1, 2, 3, 9 and 10, the machine comprises a rotatably mounted turntable-like member 12, comprising a form 14 fixed to a capstan 16 journaled in housing 22 and carrying at its center a latch device 18. At one side of the form 14 a cradle 20 is pivotally mounted on the top of the housing 22 of the machine, cradle 20 having carrier arm 24 slidably mounted thereon on which is journalled a pressure roller 26. In the illustrated embodiment of the invention, the carrier arm is moved to the right and left of FIG. 1 by air operated cylinder 30, while air operated cylinder 32 pulls roller 26 downwardly against the heating element when this is desired.

The latch device 18 comprises a hub-like housing member 33 formed with a seat 34 (see FIG. 9) against which an upturned end 37 of the heating element 36 which is to be coiled is placed to latch same to the form 14. A vertically movable shaft 40 to the end of which actuating member 42 (see FIG. 25) is keyed, is biased downwardly, as by an appropriate spring 44, to urge pin 46 into camming engagement with latch bar 48 so that latch bar 48 assumes the latching position shown in FIGS. 9 and 24. Appropriate air operated cylinder 50 (see FIGS. 1 and 15) moves shaft 40 upwardly to draw the latch bar 48 into the unlatched position shown in FIG. 23 when it is desired to release the heating element.

The form 14 is provided with a trackway 52 that is generally spiraled in configuration through, in the illustrated embodiment, the configuration comprises circles separated by rectilinear transitions. The trackway is somewhat conical in shape as indicated in FIG. 11, the trackway dropping approximately 5/32 of an inch per revolution of the form in the illustrated embodiment. Latch device 18 is positioned at the apex of trackway 52.

The embodiment illustrated is adapted to coil a heating element 36 which has been slabbed to the configuration shown in FIG. 5 by placing it between plates 54 and 56 of an appropriate press 58. The fixed plate 56 is formed with the V-shaped groove 60 into which a heating element is placed and then the movable plate 54 is moved downwardly until it contacts the heating element whereupon sufficient pressure is applied to compact the components of the element, which results in giving the elements the configuration shown in FIG. 5. It may be mentioned that the ends of the element ordinarily are not slabbed.

One end 37 of the heating element is then turned at right angles to the element, and the upturned end 37 placed against seat 34, after which latch bar 48 is moved to the latching position shown in FIGS. 9 and 24. The machine is then actuated to move pressure roller 26 from the solid line position of FIG. 9 to the position of FIG. 11, at which point cylinder 32 urges the roller 26 downwardly against the heating element to coil or wind same as the form turns. The air cylinders are then released and roller 26 backed off, whereupon the completed element may be removed after latch device 18 is reelased.

Specific Description

The capstan 16 is rotatably mounted in the top plate 60 of housing 22 and is keyed in any suitable manner to tubular rotating shaft 62 journaled in appropriate bearings 64. Shaft 62 is in turn keyed to gear 66 that meshes with gear 68 keyed to shaft 70 which is actuated by motor 72 (see FIG. 1) through magnetic clutch 74 and appropriate gear reducer 78.

The cradle 20 that slidably carries roller 26 is provided with appropriate pins 86 that pivot the cradle to lugs 88 that are fixed to the top of the housing in any suitable manner. Cylinder 30 may be of any appropriate type, and includes a piston rod 90 that is fixed to carrier arm 24 in any suitable manner. Carrier arm 24 carries an adjustable cam member 92 which is screw-threadedly mounted on stud 94 fixes as at 96 to the carrier arm. Member 92 actuates the bell crank arm 98 that is pivotally mounted as at 100 which in turn actuates a conventional type of limit switch 102, that in the illustrated embodiment is of the normally open variety.

The cradle 20 carries cam member 106 which is positioned to engage the actuating arm 108 of appropriate normally open limit switch 110 that is arranged to control the operation of magnetic clutch 74.

The cradle 20 includes a rearwardly extending arm 112 (see FIG. 1) on which cylinder 30 is securely mounted and this cylinder 30 pivots with cradle 20. Arm 112 has secured thereto an element 114 (see FIG. 2) which actuates appropriate normally closed limit switch 116 that is positioned on an appropriate support 118 located adjacent the head end of cylinder 30.

Cradle 20 is formed with an abutment surface 122 (see FIG. 11) on its lower portion that cooperates with a movement limiting screw 124 to limit the permissive downward movement of roller 26 and screw element 125 carried by cradle 20 limits outward movement of carrier arm 24 by engaging extension 127 of the carrier arm.

Cylinder 32 may be of any appropriate double acting type and normally includes piston rod 126 (see FIG. 11) that is pivotally connected as at 128 to lugs 130 integrally carried by cradle 20. Cylinder 32 is fixed in any suitable manner to housing 22 as by appropriate brackets 132.

The relationship between the cradle 20, the carrier arm 24, piston rod 126 and cylinder 32 is preferably such that the carrier arm 24 retracts along the angle of the cone of form 14.

Referring now to FIGS. 14 and 15, shaft 62 has keyed thereto beneath housing plate a gear 134 which meshes with gear 136 of transmission device 138 (see FIG. 15). Spring 44 acts between disc 140, that is received over shaft 62, and disc 142 of shaft 40 to bias shaft 40 downwardly whereby the latch bar 48 is extended to its latching position. Shaft 40 is connected as at 144 to the piston rod 146 of appropriate cylinder 50, which may be of the single acting type.

Transmission 138 is provided to give form 14 two speeds of rotation so that the same machine may be used to coil two and three turn elements. Transmission 138 includes the gear 136 which meshes with gear 150 that is keyed in any suitable manner to shaft 152 to which are fixed the cam elements 154 that control the switches providing the indexing features of the invention.

Transmission 138 also includes a gear 156 that is also keyed to gear 136, but is proportioned to mesh with gear 158 that is keyed to shaft 152. Gears 156 and 158 have fixed thereto the respective indexing plates 160 and 162. These plates are formed with rounded indexing recesses 164 and 166 that permit the changing of the transmission without disturbing the indexing of the machine; thus, recess 164 is proportioned to pass only gear 136 at one position of shaft 152 while recess 166 is proportioned to pass only gear 156 at the same position of shaft 152.

Gears 136 and 156 are keyed to a sleeve 170 (see FIG. 15) that is slidably mounted on stud 172 and is formed with hand gripping portion 174. Stud 172 is fixed to housing plate 132 by nut 176. Hand gripping portion 174 carries lock pin 178 (see FIG. 19) that is urged inwardly by appropriate spring 180 and into engagement with either of two latching holes 182 and 184 formed in stud 172.

One changes to the gear that is desired by merely moving pin 178 outwardly and positioning the desired gear of the transmission with the desired gear that is keyed to shaft 152, when plates 160 and 162 are positioned to permit this change.

The cam plates 154 of control box 190 are pivotally received about a sleeve 192 which is keyed to shaft 152. The discs 194 to which the cam plates 154 are secured are fixed in any suitable manner to sleeve 192. As indicated in FIGS. 15, 18 and 20, the respective cam plates 154 are disposed in the desired position to appropriately actuate controlling switches 198 and then are fixed to the respective discs by bolts 200. Three cam plates 154 and cooperating switches 198 are, in the illustrated embodiment, needed for each coil configuration desired, one switch 196b for deenergizing the solenoid of a coiling operation initiation switch 200 that is shown in FIG. 27 and a switch 198c for properly indexing the form just prior to the initiation of a coiling operation.

The switches 198 are fixed to slider elements 202 that are held in adjusted position by screw members 204. The slider members 202 may be adjusted sidewise of FIG. 18 by loosening screw members 204 and appropriately rotating adjustment screws 206.

The latching device 18 is best illustrated in FIGS. 14 and 22 through 26. As indicated in FIGS. 14 and 25, the actuating member 42 is formed with a keying projection 210 that cooperates with complementary projection 212 formed in shaft 40. Member 42 is formed with a flattened upwardly projecting extension 214 which is perforated at 216 to receive pin 46 that also rides in recesses 218 formed in housing 32. Pin 46 extends through inclined elongate slot 220 that is formed in the latch bar 48. Of course, when member 42 is pulled downwardly, pin 46 forces bar 48 to the position of FIG. 24, while movement in the opposite direction positions bar 48 as shown in FIG. 23.

As indicated in FIGS. 1 and 2, the housing 22 encompasses and encloses most of the operating mechanism of the machine. Appropriate door 221 may be provided for access to the interior of the housing. Preferably, a worker's stand is provided where indicated at 222 in FIGS. 1 and 3 which may be adjusted in height for the comfort of the worker.

An electrical control box 224 is fixed to the housing 22 at the worker's lefthand side as he stands in front of machine 10. Box 224 may be provided with start push button switch 226 and index push button switch 228 for purposes that will now be made clear.

*Control Circuit*

As already indicated, the worker stands in front of the machine 10 on appropriate stand 222. He operates the machine by pressing buttons 226 and 228 as required and removing and applying the elements 36 to and from form 14.

Referring to FIG. 27, which is provided only to illustrate the principles involved, it will be noted that push button switch 226 when closed energizes two position relay 200 which includes a core 230 secured to an arm 232 that moves contacts 234 between fixed contacts 236 and 238, arm 232 being biased into contact with contacts 236 by an appropriate tension spring 240 in the illustrated embodiment. A lead 242 extends between line side contact 236 and lead 244 which extends to appropriate transformer 246 which energizes the control circuit of the machine by reason of its appropriate association with load lines 248 as diagrammatically illustrated in FIG. 27.

A lead 250 also extends between the line side contacts 236 and 238 to permit the energization of coil 252 of relay 254, when relay 200 is energized.

Relay 254 when energized closes contacts 256 which completes the circuit to coils 258, 260 and 261, that are associated with the diagrammatically illustrated air control valves 262, 264 and 266 that are shown in FIG. 27. Valves 262, 264 and 266 are illustrated merely to indicate an appropriate type of valve that may be provided to control the flow of air to and from cylinders 30, 32 and 50. For purposes of facilitating the description of an appropriate mode of operation, the valves diagrammatically illustrated are similar in nature and comprise an air tight cylinder 270 in which a piston rod 272 is slidably mounted that fixedly carries appropriate pistons 274 and 276. The cylinder designated 270a receives air under pressure from an appropriate source through conduit 278, while conduit 280 vents cylinder 50. The cylinder designated 270b receives air under pressure from an appropriate source through conduit 282, while conduits 284 and 286 vent opposite ends of the cylinder 32. The cylinder designated 270c receives air under pressure from an appropriate source through conduit 288 while conduits 290 and 292 vent opposite ends of cylinder 32.

For illustrative purposes only, solenoid coils 258, 260 and 261 have been shown surrounding one end of the respective rods 272 while solenoid coils 300, 302 and 304 have been shown surrounding the other ends of the respective rods. It is assumed that the respective coils act to throw the respective rods in the directions indicated by the arrows when said coils are energized.

Also, compression springs 306 have been shown applied against the ends of the respective rods 272 to center the pistons appropriately in accordance with the operation of the machine when the coils just referred to are not energized.

It will be noted that coils 258, 260 and 261 are connected in parallel in lead 257, while coils 300, 302 and 304 are connected in parallel in lead 259 that extends to load side contact 236.

Lead 257 extends to an appropriate form of time delay relay 310, such as an Agastat relay, made by AGA Division of Elastic Stop Nut Corporation of America, Elizabeth, New Jersey, wherein it is connected in series with the coil 312 of said relay and thence to lead 314 that extends to transformer 246.

Coils 258, 260 and 261 are also connected in parallel with coil 316 that energizes relay 318 which controls the operation of magnetic clutch 74. Magnetic clutch 74 may be of the type that includes a clutch portion 320 and a brake portion 322 which may be alternately energized by operation of relay 318. In the embodiment illustrated, relay 318 is of the two position type and normally closes the circuit to the brake portion 322 by virtue of spring 323, energization of coil 316 being effective to energize clutch portion 320 whereby rotation of form 14 is effected.

Lead 259 extends to contacts 330 of relay 310 and thence to lead 314.

The control circuit is arranged so that the form 14 may be indexed from the position in which a particular coiling operation ends to the position in which all coiling operations are to begin. As diagrammatically illustrated in FIG. 27, push button switch 228 actuates a circuit which energizes coil 340 of index relay 342 (relay 342 maintains contacts 344 open by virtue of compression spring 343); energization of coil 340 closes contacts 344, which by reason of leads 346 and 348 energizes coil 316 of relay 318 to actuate clutch portion 320 whereby movement of form 17 is initiated. As soon as the appropriate cam plate member reaches switch 198c, this circuit is opened to deenergize relays 342 and 318 and stop movement of the form at its desired position for commencing of the coiling operation. Normally open switch 116 is closed by arm 114 carried by cradle 20 when cylinder 32 is fully retracted so that the indexing circuit is energizable only between coiling operations.

It may also be mentioned that the cam plate members for switches 198a and 198b are positioned to open the circuits in which the switches are connected at the point where it is desired to stop rotation of form 14 during the coiling operation.

Main switch 350 may be opened and closed to motor 72 to start same and shut same off; preferably, motor 72 runs continuously during the period machine 10 is in operation. Power lines 248 may be connected to any suitable source of energy, while air conduits 278, 282 and 288 may be connected through suitable valving to a source of air under pressure of approximately 110 pounds per square inch, the feed to cylinders 270a, 270b and 270c being about 80 pounds per square inch in the illustrated embodiment.

The above described embodiment is represented as adapted to coil heating elements that are initially slabbed to a triangular cross section as indicated in FIG. 5, it is applicable to coil elements that have other cross section such for example as shown in FIGS. 6, 7, and 8. The form 14 may in such case require modification of the height of the spiral shoulder to provide the required winding track and the pressure roller 26 may be changed or other pressure element substituted appropriate for the particular cross sectional shape of the element. For example, the carrier arm 24 and pressure roller 26 may be changed, as indicated at 24a and 26a respectively in FIG. 13, to coil the elements of FIGS. 6 and 7, the roller 26a being shouldered as at 351 to properly engage the element. Elements having the configuration of FIG. 8 may be coiled by either of the illustrated embodiments, the configuration of the rim of the pressure roller being appropriately modified to conform to the surface of the element.

*Operation*

In the operation of the above described embodiment, assuming that the form 14 is in the appropriate starting position for coiling, the straight heating element with upturning end 37 in place in position as shown in FIG. 9, with the upturned end 37 in the seat 34 and then the switch 226 is pressed to start the operation. This causes relay 220 to be energized, which in turn energizes relay 254 and simultaneously energizes coils 258 and 260 of valves 262 and 264, respectively. Coil 258 throws rod 272 to the right of FIG. 27 and vents the lower end of cylinder 50 which permits spring 44 to draw shaft 40 downwardly whereby latch bar 48 is extended to the position of FIGS. 9 and 24. Simultaneously, the rod 272 of valve 264 is thrown to the right, which admits air under pressure to the right hand end (see FIG. 1) of cylinder 30, and vents the other end of the cylinder; this starts carrier arm 24 and roller 26 moving toward the element that is to be coiled and over the trackway of form 14. The carrier moves to the positions indicated by broken lines in FIG. 9 and in doing so, cam member 92 that is carried by carrier arm 24 actuates bell crank arm 98 to close switch 102, which causes energization of coil 261 whereby rod 272 of control valve 266 is thrown to the right of FIG. 27 to admit air to the upper end of cylinder 32 whereby roller 26 is brought downwardly against the element that is located on the form 14. In moving carrier arm 24 downwardly, the forward end of cradle 20 is moved downwardly about pins 86 which brings cam member 106 into contact with actuating arm 108 of switch 110 that closes the circuit to coil 316 of relay 318 and energizes the clutch portion 320 to rotate form 14.

Form 14 rotates until the cam member 154 carried in the control box 190 for actuating switch 198a engages same to open the circuit and deenergize the magnetic brake. During this period, the form 14 rotates approximately three times to coil the illustrated heating element in the manner indicated in FIG. 10.

As soon as switch 198a opens, coil 312 of time delay relay 310 is deenergized and contact disc 360 moves slowly toward contacts 330, in accordance with the particular characteristics of the specific time delay relay that is employed. When contacts 330 are closed, coils 330, 302 and 304 are energized, relay 300 having been previously deenergized by reason of the opening of switch 198b which is set to open simultaneously with switch 198a or upon release of switch 226.

Thereupon, the rods 272 of the valves 262, 264 and 266, are simultaneously thrown to the left of FIG. 27; in the case of valve 262, this supplies air to the lower end of cylinder 50 which raises shaft 40 to withdraw the latch bar 48 of the latching device whereby the heating element is released. In the case of valve 264, air is supplied to the left hand end of cylinder 30, while the head end of the cylinder is vented, and in the case of valve 266, air is supplied to the lower end of cylinder 32 while the upper end of the cylinder is vented. This raises the carrier arm and pressure roller away from the heating element and withdraws the carrier arm and roller to the position of FIGS. 9 and 14.

The operator may then grasp the heating element and remove it from the form.

The operator then indexes the form to the position of FIG. 9 by pressing push button switch 228, which energizes relay 342 that in turn energizes relay 318 to activate clutch portion 320 whereby rotation of the form 14 commences. As soon as the cam member in control box 190 that cooperates with switch 198c engages same, relay 342 is deenergized which in turn deenergizes relay 318 and stops rotation of the form. The next coiling operation is then commenced and repeated as long as there are elements to be coiled.

If a two turn coil is desired, transmission 138 is changed to bring gear 156 into meshing engagement with gear 158. The operation then proceeds as before, switches corresponding to switches 198a and 198b being appropriately positioned to stop the coiling of the element when it is desired to do so; of course, switches 198a and 198b would be disconnected.

After the heating element has been thus coiled in the spiral form, it is placed in a die 5 (see FIG. 5) having a spiral groove 6 in the top face of the same spiral configuration as that of the coiled element and of a cross section of the same general V-shape as the V-shape imparted to the heating element by the dies 54 and 56 of FIG. 4, and when thus placed in the groove 6 a flat faced die 7 is applied under a heavy pressure to the heating element to impart the final shape thereto.

*Advantages of Invention*

My invention provides a number of significant advantages which are new in the art of coiling electric sheath-type heating elements. The coiling operation is not only safe, but is also substantially automatic. A worker does not have to place his fingers anywhere near dangerous operating parts, and controls the machine by merely pressing switches. The machine always indexes to the same starting point regardless of the coiling configuration applied to the heating elements, and the machine never overrides during the actual coiling of the element, the coiling stopping immediately at the same predetermined place for the particular coiling configuration desired.

Moreover, the element is coiled by pressing same against the rotating form with a uniform pressure; when coiling has started, the pressure roller is held against the element on the form by air pressure in the head end of the cylinder, which insures that a uniform pressure is applied to the heating element in coiling same.

Another important feature is that when the coiling operation ceases, the pressure roller and latch device release the heating element only after an appropriate time delay, which prevents the element from jumping out of its position on the form.

Moreover, the device, while it is applicable to coil heating elements of substantially any desired cross section, is adapted to coil heating elements of generally triangular cross section like that of FIG. 5, or of other similar flat sided shapes, in the direction of the width of the flat face and thus the heating element may be initially compressed to approximately the eventual cross section and thereby avoiding the disadvantages of several entirely different reshapings thereof and it may have a shape corresponding sufficiently closely to the die cavity between the final pressure dies to seat and compress readily therein without displacement or distortion or excessive wear on the dies.

While I have shown and described my invention in a preferred form I am aware that various changes may be made therein without departing from the principles of the invention, the scope of which is to be determined by the appended claims.

What is claimed is:

1. A machine for winding rod like heating elements in a generally spiral coil form, said machine comprising a rotatable winding head on which the heating element is windable in the coil form, and mechanism by which the winding head is rotatable a predetermined measured amount for each coiling operation, said mechanism including controls which locate the winding head at a predetermined starting position for each coiling operation thereof and select and stop the rotation of the winding head at a predetermined stopping position after the head has rotated more than one turn, said winding head being provided with a ledge substantially normal to and receding spirally from the axis of rotation of the head and descending lengthwise therearound, said ledge having a riser extending therealong substantially perpendicular thereto at the side thereof nearest to said axis and conjointly with the ledge providing an elongated descending generally spiral corner seat in which the heating element is windable in the coil form, the winding head being provided at the upper end of the spirally descending corner seat with a holder to which an end of the heating element is securable for rotation with the winding head for coiling thereon, and a coil former past which the corner seat advances during the coiling operation and by which the heating element is pressed toward the corner of the corner seat and in lengthwise conforming engagement against the ledge and the riser as the end secured heating element is rotated with the winding head, and control means operable respectively at the beginning and at the conclusion of each winding operation to project the coil former toward the winding head into pressing engagement against the end secured heating element at the beginning of each coiling operation and to retract the coil former away from the winding head to an inactive position at the conclusion of each coiling operation.

2. A machine as defined in claim 1 in which the coil former is operable in each of two directions transverse to one another in one of which it applies a predetermined amount of pressure in a direction to press the heating element against the ledge and in the other of which it applies a predetermined amount of pressure to press the heating element against the riser.

3. A machine as defined in claim 1 in which the coil former is operable in each of two directions transverse to one another and is controlled by timing means which delays operation thereof in one direction until operation thereof has occurred in the other direction.

4. A machine as defined in claim 1 in which the coil former is operable in each of two directions transverse to one another and provided with separate operating means by which it is positively operable in each direction independently of operation thereof in the other direction.

5. A machine as defined in claim 1 in which the coil former is reciprocably mounted on a pivoted carrier and independently operable means are provided for pivotally operating the carrier and reciprocating the coil former.

6. A machine as defined in claim 1 in which the coil former has a presser face which is disposed in a position of a hypotenuse to the angle of the corner seat when the coil former is positioned to press the heating element toward the corner of the corner sat.

7. A machine as defined in claim 1 in which the coil former has a corner seat facing toward the corner seat of the winding head to engage the heating element therebetween when the coil former is positioned to press the heating element toward the corner of the corner seat of the winding head.

8. A machine as defined in claim 1 in which the operations of the winding head and coil former are controlled by means which delays rotation of the former head until after the coil former is projected toward the coil former into pressing engagement against the end secured heating element and delays retraction of the coil former away from the winding head until after rotation of the winding head has been stopped.

9. A machine as defined in claim 1 in which means is provided which is adjustable for selectivity of the amount of rotation of the winding head from the starting position to the stopping position thereof and for causing retraction of the coil former to occur at the conclusion of the selected amount of rotation of the winding head.

References Cited in the file of this patent

UNITED STATES PATENTS

| | | |
|---|---|---|
| 725,026 | Boehm | Apr. 14, 1903 |
| 2,143,442 | Kellogg | Jan. 10, 1939 |
| 2,264,507 | Burger | Dec. 2, 1941 |
| 2,491,857 | Greiner | Dec. 20, 1949 |
| 2,677,172 | Oakley | May 4, 1954 |
| 2,701,410 | Huck et al. | Feb. 8, 1955 |